Oct. 10, 1967     N. D. SMITH     3,345,876
HIGH PRESSURE INDICATOR
Filed Sept. 3, 1965
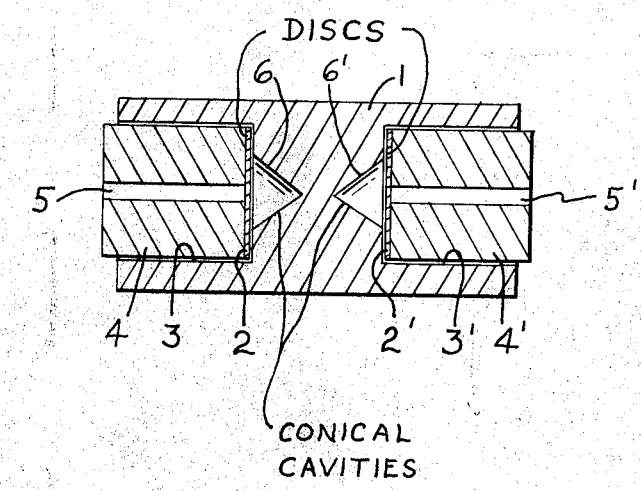
INVENTOR
NATHAN D. SMITH
BY Harry M. Saragovitz,
Edward J. Kelly,
& A. J. Dupont     ATTORNEYS

United States Patent Office 3,345,876
Patented Oct. 10, 1967

3,345,876
HIGH PRESSURE INDICATOR
Nathan D. Smith, Darlington, Md. 21034
Filed Sept. 3, 1965, Ser. No. 485,132
4 Claims. (Cl. 73—388)

ABSTRACT OF THE DISCLOSURE

Peak pressures of 10,000 to 100,000 p.s.i., encountered in gun barrels during firing, are indicated by the degree of deformation of a disc 2 or 2' positioned across the base of a conical cavity 6 or 6'. A plug 4 or 4' keeps the disc from falling out prior to use. The opposite side of the disc connects with the pressure in the gunbarrel.

---

The invention described herein may be manufactured and used by or for the Government for governmental purposes, without the payment to me of any royalty thereon.

The present invention relates to simple, low-cost and highly reliable apparatus for indicating peak pressures encountered in high pressure applications, such as in gun barrels during firing of the gun.

In the drawing the single figure is a cross section of the invention.

Body member 1 preferably has two deformable discs 2, 2' in bore holes 3, 3' held in place by cylindrical plugs 4, 4' having holes 5, 5' therein. Recesses are formed in body member 1 at 6, 6'. These recesses are preferably conical in shape so that the metal of discs 2, 2' is "drawn" down the sides thereof in a predictable manner as pressure is exerted on the discs. However, recesses of other shapes could be used if desired. Plugs 4, 4' may be secured in bore holes 3, 3' in a well known manner such as by a tight pressed fit, or screw threads, as examples. For some applications it would be possible to omit plugs 4, 4' entirely or to secure discs 2, 2' by other expedients. Also, holes 5, 5' could be dispensed with and pressure could be admitted to disc members 2, 2' through other passageways not illustrated.

Operation

The assembly is subjected to high pressures to be checked, such as the pressure existing in a gun barrel as the gun is fired. The increased pressure enters the assembly through holes 5, 5' and pushes discs 2, 2' into recesses 6, 6' to a degree in proportion to the increased pressure. The discs may then be examined to determine the degree of pressure to which the assembly has been subjected.

The invention may be used in applications involving only moderately high pressures, e.g. 10,000 p.s.i., or extremely high pressures, e.g. 100,000 p.s.i. For moderately high pressures the discs 2, 2' may be made of fairly thin or fairly soft, readily deformable metal for example while extremely high pressures the discs may be made of thicker or harder to deform metal. Or, recesses 6, 6' may be made larger for moderately high pressures but smaller for extremely high pressures.

The assembly illustrated may be used to check two different pressures simultaneously by the two indicators being connected, by means not shown, to the two sources of pressure. Or, both indicators may be used to double-check a single source of pressure. If only one pressure indication is desired then the right end, or left end, of the assembly may be dispensed with, or only one disc may be inserted in one bore hole 3 or 3'.

Prior art comparison

A well-known type of high pressure indicator in common use is called a crusher gauge and is illustrated in U.S. Patents 2,362,484 and 2,574,600. Such type of gauge comprises a housing with a cylinder therein and a piston in the cylinder. A sphere of copper is placed between the flat end of the piston and the flat end of the cylinder. Pressure against the piston crushes the sphere of copper in proportion to the force exerted against the piston.

The crusher gauge is inaccurate and inconsistent in successive readings for several reasons. The grain in the metal ball affects the degree of crushing thereof. However, there is no practical way of knowing or controlling the orientation of the grain of the sphere as it is placed in the gauge. Therefore it may be crushed to a lighter extent for one test of pressure and to a greater extent for a second test of the same pressure. In the present invention the disc is deformed by a uniform and predictable amount by explosions of equal magnitude.

Further, particles from the explosion may be forced into the clearance between the piston and cylinder wall of the crusher-type gauge, thereby introducing frictional resistance to piston movement, which frictional resistance will vary from test to test. The present invention uses no piston to introduce such error.

Still further, crushing of the sphere, between flat faces, is only slight and difficult to measure accurately. Also, the sphere is crushed into different shapes in successive tests, thereby making measurements difficult and inacurate. In the present invention the sloping-sided orifice 6 or 6' forms a die to receive the metal as it is "drawn" or forced to a depth in proportion to the amount of pressure. The discs, which may be circular or of other shape, can be stamped out at low cost and yet they will have uniform hardness, drawing qualities and malleability so that like pressures produce like formations of metal along the cone-shaped orifices 6, 6'.

I claim:

1. Pressure indicating apparatus comprising a body member, a bore in said body member, a recess at the end of said bore, and a disc member in said bore and covering said recess, said disc member comprising material which is permanently deformed when subjected to pressure, and securing means in said bore admitting pressure to said disc and securing said disc in place adjacent to said recess.

2. Apparatus as in claim 1 wherein said securing means comprises a substantially cylindrical plug engaging the walls of said bore and clamping said disc at the end of said bore covering said recess.

3. Apparatus as in claim 1 wherein said recess is substantially conical in shape.

4. Pressure indicating apparatus comprising a body member, a plurality of bores in said body member, a recess in the end of each bore, and a disc member in each bore, said disc members comprising material which is permanently deformed into said cavities when subjected to pressure introduced through said bores.

(References on following page)

References Cited

UNITED STATES PATENTS 3,085,437  4/1963  Osterstrom _____ 73—407

FOREIGN PATENTS 874,568  5/1942  France.

OTHER REFERENCES

Tschappat: "Experiments in Interior Ballistics," Mechanical Engineering, August 1962, vol. 48, No. 8, pp. 819 to 825.

LOUIS R. PRINCE, *Primary Examiner*.

DONALD O. WOODIEL, *Assistant Examiner*.